US011835310B1

(12) United States Patent
Lanore

(10) Patent No.: US 11,835,310 B1
(45) Date of Patent: Dec. 5, 2023

(54) FIREARM PROXIMITY ALERT SYSTEM

(71) Applicant: Carl J. Lanore, Louisville, KY (US)

(72) Inventor: Carl J. Lanore, Louisville, KY (US)

( * ) Notice: Subject to any disclaimer, the term of this patent is extended or adjusted under 35 U.S.C. 154(b) by 105 days.

(21) Appl. No.: 17/369,748

(22) Filed: Jul. 7, 2021

Related U.S. Application Data

(60) Provisional application No. 63/133,782, filed on Jan. 4, 2021.

(51) Int. Cl.
F41A 17/06 (2006.01)
G08B 7/06 (2006.01)
H04W 4/02 (2018.01)
G01S 1/04 (2006.01)

(52) U.S. Cl.
CPC .......... F41A 17/063 (2013.01); G01S 1/0428 (2019.08); G08B 7/06 (2013.01); H04W 4/023 (2013.01)

(58) Field of Classification Search
CPC .... F41A 17/063; G01S 1/0428; H04W 4/023; G08B 7/06
See application file for complete search history.

(56) References Cited

U.S. PATENT DOCUMENTS

| | | | | |
|---|---|---|---|---|
| 6,412,207 B1 * | 7/2002 | Crye | ...................... | F41A 17/56 42/70.08 |
| 6,429,769 B1 * | 8/2002 | Fulgueira | ............. | G08B 25/008 340/12.54 |
| 8,726,556 B1 * | 5/2014 | Willingham | .......... | F41A 17/063 42/70.11 |
| 8,955,421 B1 * | 2/2015 | Kountotsis | ............ | F41A 17/063 89/1.11 |
| 9,829,275 B2 * | 11/2017 | Madrid | ............... | F41C 33/0209 |
| 10,237,691 B2 * | 3/2019 | Cheung | .................... | H04W 4/80 |
| 10,580,271 B1 * | 3/2020 | Sanders | ................ | F41A 17/063 |
| 10,825,325 B2 * | 11/2020 | Madden | .................. | H04W 4/80 |
| 11,041,685 B2 | 6/2021 | Black et al. | | |
| 2005/0141997 A1 * | 6/2005 | Rast | ........................ | F41A 19/03 416/229 R |
| 2011/0030262 A1 * | 2/2011 | O'Shaughnessy | .... | F41A 17/063 42/70.01 |
| 2014/0173959 A1 * | 6/2014 | Kountotsis | ............ | F41A 17/063 102/517 |
| 2014/0173960 A1 * | 6/2014 | Kountotsis | ............ | F41A 17/063 42/1.02 |
| 2018/0268680 A1 * | 9/2018 | Ross, Jr. | ................ | F41A 17/063 |
| 2020/0109905 A1 * | 4/2020 | Black | ................. | G08B 13/2448 |
| 2020/0191511 A1 * | 6/2020 | Breda | .................... | F41A 17/063 |
| 2020/0359113 A1 | 11/2020 | Dahm et al. | | |

* cited by examiner

Primary Examiner — Joshua E Freeman
(74) Attorney, Agent, or Firm — Law Office of J.L. Simunic; Joan L. Simunic

(57) ABSTRACT

A firearm proximity alert system includes an identification tag reader application for execution on a smartphone or smartwatch or other processor enabled device wherein the application provides for wireless communication between the reader and a machine readable identification tag. The identification tag assembly is positioned along a firearm to create a traceable firearm. The reader continuously or selectively broadcasts a signal to locate the tag. If the tag is not detected, the application issues an alert through the smartphone.

17 Claims, 1 Drawing Sheet

FIREARM PROXIMITY ALERT SYSTEM

PRIORITY

The present application claims priority to U.S. 63/133,782 filed 4 Jan. 2021, which is included herein in its entirety.

GOVERNMENT INTEREST

The present invention was developed without any government support.

FIELD OF THE INVENTION

The present invention relates generally to a system for monitoring the proximity of a firearm relative to a monitoring device. More specifically, the present invention is a firearm monitoring system that links a digital tag on the firearm to a programmed reader wherein the reader is programmed to issue an alert if the firearm tag is not detected.

BACKGROUND OF THE INVENTION

In recent years, the number of persons carrying small firearms has increased dramatically. Normally, these firearms are secured on the person authorized to carry the firearm. Occasionally however, the authorized person may need to remove the firearm from its normal carrying location to allow the carrier to perform other activities. In most cases, the firearm is in sight of the carrier at all times and is returned to its normal carrying location when the activity is completed. But if the carrier is distracted at some point while the firearm is not being carried, there is a risk that the firearm may be left unattended. This can create risks for the authorized carrier, who is responsible for the firearm, and for the community at large.

Thus, it would be beneficial to have a system that notifies the authorized carrier if the firearm is not within a designated proximity of the carrier.

SUMMARY OF THE PRESENT INVENTION

The present invention is a firearm proximity alert system. The firearm proximity alert system comprises a proximity alert application and an identification tag. The proximity alert application is designed for execution on a smartphone or smartwatch or other processor enabled device and functions to generate an alert on the device when the identification tag is not located within a predetermined proximity of the reader.

DETAILED DESCRIPTION OF THE PRESENT DEVELOPMENT

The present invention is a firearm proximity alert system comprising an IoT (internet of things) beacon in wireless communication with a digital transponder. Beacon —transponder systems are generally known in the art. For the present invention it is anticipated that the transponder may be affixed to the firearm and that the beacon may be incorporated in the processor-enabled device, or that the transponder may be incorporated in a processor-enabled device and the beacon affixed to the firearm. The primary requirement is that a beacon is provided and a transponder is provided and the beacon and transponder are in wireless communication.

In an exemplary embodiment, the firearm proximity alert system comprises a proximity alert application that serves as the beacon and that is accessible through a processor-enabled device and an identification tag transponder. The identification tag is affixed to the firearm. The proximity alert application is designed for execution on a smartphone or smartwatch or other processor enabled device. The application-enabled device serves as a reader for the identification tag. The proximity alert application generates an alert on the device when the identification tag is not located within a predetermined proximity of the reader.

The transponder or identification tag can be any tag known in the art that allows for wireless detection of the tag. For example, the identification tag can be a radio frequency identification tag or RFID tag, a Bluetooth-enabled tag or tracker or transponder or stamp, or a similar device can interact with a signal broadcast by a digital reader or an IoT beacon. The identification tag is preferable small enough to be secured to a predetermined firearm without negatively affecting the performance of the firearm. In a preferred embodiment, the identification tag is in the form of a small box or an essentially flat electronically-coded sticker that can be affixed to the handle of the firearm or within the handle of the firearm, although the exact placement can be left to the discretion of the user.

Figure 1:
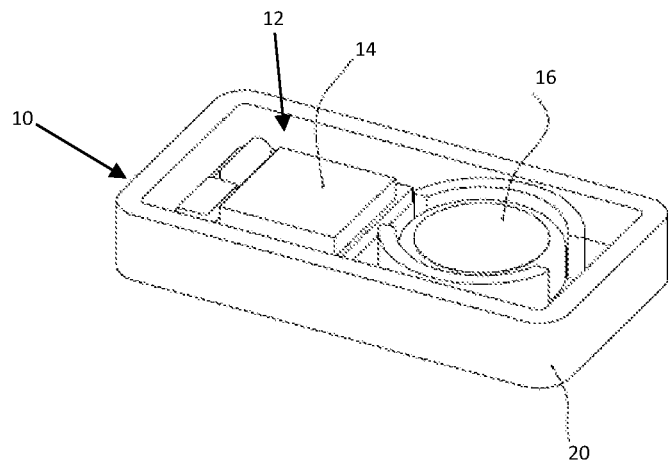
FIG. 1 shows an exemplary identification tag made in accordance with the present invention wherein the tag comprises a housing, a transmission module further comprising a circuit board 14, and a battery; and, FIGS. 2A-2C show some possible placement positions for the identification tag of FIG. 1.

Tags that electronically communicate with a remote reader are generally known in the art. For the present invention, the tag may be a passive tag, that is a tag that does not require a battery to allow for communication with the reader. Alternatively, the tag may be battery powered. FIG. 1 shows an exemplary identification tag 10. The tag 10 comprises a housing 20, a transmission module 12 further comprising a circuit board 14, and a battery 16. In an exemplary embodiment, the transmission module is a commercially-available BLE EH ES 201 module and the battery is a coin-type battery, as are commonly used in hearing aids.

The proximity alert application is designed for execution on a smartphone or a smartwatch or other processor enabled device and functions to generate an alert on the device when the identification tag is not located within a predetermined proximity of the reader. As used herein, the term "application" is intended to encompass any number of machine-readable code sequences that create a software program that operates on a computer processor. As used herein, the term "proximity alert application" means an application that is programmed into a computer processor that is designated as the beacon or reader for the identification tag affixed to the firearm.

As used herein, the term "reader", which may be used interchangeably with "beacon", means a wireless communication device that sends out a signal and waits for any tags capable of detecting the signal that are within range of the signal to respond. An exemplary embodiment of a reader and tag would be an RFID reader and passive RFID tags. As is known in the art, the RFID reader is a fixed or mobile network connected device with an antenna that sends power as well as data and commands to the passive RFID tags. The RFID reader acts as an access point for an RFID tagged item so that the tag's data can be made available to the proximity alert application. When the passive RFID tag is scanned by the reader, the reader transmits energy to the tag which powers it enough for the chip and antenna to relay information back to the reader. The reader then transmits this information back to an RFID computer program for interpretation. In an alternative exemplary embodiment, the reader and tag are Bluetooth-enabled technology. The tag is a micro low-energy Bluetooth beacon (BLE) equipped with a coin type battery that continually transmits an electronic signal and the reader is any type of device capable of receiving and recognizing a BLE signal.

As used herein, the term "smartphone" is intended to encompass any number or different types of processor enabled devices capable of receiving electronic signals and providing audio and/or visual and/or tactile information to a human operator. Several examples include, but are not limited to, Bluetooth enabled mobile phones, tablet computers, portable computers, PDAs, portable music devices and smartwatches. Accordingly, the device and/or method steps are not to be construed as limiting in any manner. As is known in the art, processor-enabled devices such as those mentioned above generally include installed software adapted to generate user icons, and to display the icons on the display screen of the device. An actuating means is provided for actuating the icon through use of a touch sensitive smartphone or tablet screen, and/or a keypad, for example. Selecting the proximity alert icon or enabling the same upon startup of the device launches the system application and activates the device's wireless communication unit or reader.

The processor-enabled device includes a memory that stores operating instructions in the form of program code for a processor within the device to execute. When activated, the processor executes program code stored in the memory to cause the device to perform specified functions. Processors and how they function, and types of memory used in processor-enabled devices and how memory functions, are extremely well known in the art; therefore no further description will be provided herein.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's smartphone, partly on the user's smartphone, as a stand-alone software package, partly on the user's smartphone and partly on a remote computer or entirely on the remote computer or server. In the latter scenario, the remote computer may be connected to the user's smartphone through any type of network, including a cellular network connection, a local area network (LAN) or a wide area network (WAN), or the connection may be made to an external computer, for example, through the Internet using an Internet Service Provider.

Figure 2A:
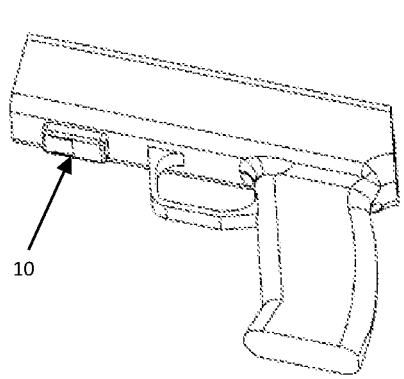
Figure 2B:
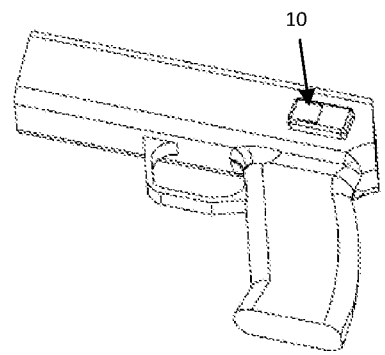
Figure 2C:
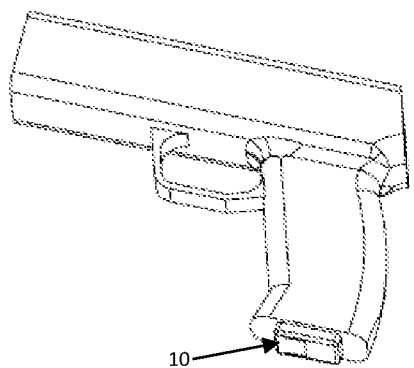

The invention functions as follows: The identification tag is affixed to the firearm that is to be monitored with the reader. The firearm carrier may affix the tag anywhere on the firearm. FIGS. 2A-2C show some possible placements for the identification tag. The proximity alert application is loaded onto the smartphone and enabled. In a first embodiment, the proximity alert application opens a connection page or screen display requiring the smartphone user to identify the identification tag to which the reader is to transmit energy to allow the tag to relay information back to the reader and the maximum distance that the reader allows between the location of the reader and the location of the identification tag. The program code provides instructions to the processor to transmit the energy and wait for a response from within the user-designated distance range. If a response is received, the processor repeats the send-receive process approximately every 30 seconds. If a response is not received, the program code provides instructions to the processor directing the processor enabled device to generate an alert on the device. Alternatively, the identification tag may transmit energy to the reader within a specified maximum distance. If the reader does not detect the transmitted signal, the program code provides instructions to the processor directing the processor enabled device to generate an alert on the device.

The form of the alert may be preprogrammed into the device or the user may designate the form of the alert. For example, the device screen may flash or the device may emit an audible alarm or the device may vibrate or a combination thereof. In a preferred embodiment, the processor-enabled device will continuously send out an alert until the identification tag returns to the designated detection range of the device.

Optionally, the proximity alert application may allow for a plurality of firearms to be detected simultaneously, or may allow for a user to include a menu of firearms that may be detected but that allows the user to designate one or more firearms for detecting at any particular time. For example, if a user has Firearm A, Firearm B and Firearm C, and the user will be carrying Firearm B and storing Firearm A and Firearm C, the user can direct the proximity alert application to only send out a signal that matches Firearm B. If Firearm B is moved outside of the designated distance range, the processor-enabled device will alert the user. Alternatively, if a user has Firearm A, Firearm B and Firearm C, and the user will be carrying Firearm B and will have Firearm A and Firearm C within close range of the user, for example when practicing at a shooting range, the user can direct the proximity alert application to send out a signal that matches Firearm A, Firearm B and Firearm C. If any one of Firearm A, Firearm B or Firearm C is moved outside of the designated distance range, the processor-enabled device will alert the user indicating which firearm is out of detection range. As is known in the art, the program code can be written to allow a user to enter a menu of identification tags one time and then use a toggle to designate which tags are to be followed at any particular time.

Optionally, the proximity alert application may allow the user to designate detection ranges for each identification tag rather than having a pre-programmed range. The user may select to have the range constant for all identification tags in the user's menu or the user may enter separate distances for each tag. For example, if a user has Firearm A, Firearm B and Firearm C, and the user will be carrying Firearm B and have students training with Firearm A and Firearm C, for example when practicing at a shooting range, the user can direct the proximity alert application to send out a signal for Firearm B when the B tag is not detected within 20 feet, to send out a signal for Firearm A when the A tag is not detected within 75 feet, and to send out a signal for Firearm C when the C tag is not detected within 200 feet. As is known in the art, the program code can be written to allow a user to enter a menu of identification tags one time and a menu of possible detection distances, and then to use toggles to designate which tags are to be followed at any particular time at what distance.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Unless otherwise indicated, all numbers expressing quantities of components, conditions, and otherwise used in the specification and claims are to be understood as being modified in all instances by the term "about".

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A firearm proximity alert system consisting of an IoT beacon in wireless communication with at least one digital transponder, wherein the transponder is incorporated in the processor enabled device and the beacon is affixed to the firearm, and wherein the transponder sends out a wireless signal and the beacon is configured to respond to the transponder's signal when the beacon is within a predetermined proximity of the transponder, and wherein an alert is produced on the processor-enabled device by an application in the processor-enabled device if the beacon does not respond to the transponder's signal.

2. The system of claim 1 wherein the processor-enabled device is a smartphone, a smartwatch, a Bluetooth enabled mobile phone, a tablet computer, a portable computer, a PDA, a portable music device.

3. The system of claim 1 wherein the transponder is a radio frequency identification tag, an RFID tag, a Bluetooth-enabled tag, a Bluetooth-enabled tracker, a Bluetooth-enabled transponder, a Bluetooth-enabled stamp, a device that can interact with a signal broadcast by a digital reader or a device that can interact with a signal broadcast by an IoT beacon.

4. The system of claim 3 wherein the transponder is a passive transponder or the transponder is a battery powered transponder.

5. The system of claim 1 wherein the transponder comprises a housing, a transmission module further comprising a circuit board, and a battery.

6. The system of claim 1 wherein the beacon signal is directed within the application to emit a signal to locate a specific transponder within a predetermined proximity of the beacon.

7. The system of claim 1 wherein the alert is produced by flashing on a device screen or by an audible alert emission or by vibration of the processor-enabled device or by a combination thereof.

8. The system of claim 1 wherein the beacon is in wireless communication with a plurality of transponders.

9. The system of claim 1 wherein the application allows a user to designate the detection range between the beacon and the transponder or to disable the wireless communication between the beacon and the transponder.

10. A firearm proximity alert system comprising an IoT beacon in wireless communication with at least one passive digital transponder, wherein the transponder is incorporated in the processor enabled device and the beacon is affixed to the firearm, and wherein the transponder sends out a wireless signal and the beacon is configured to respond to the transponder's signal when the beacon is within a predetermined proximity of the transponder, and wherein an alert is produced on the processor-enabled device by an application in the processor-enabled device if the beacon does not respond to the transponder's signal.

11. The system of claim 10 wherein the processor-enabled device is a smartphone, a smartwatch, a Bluetooth enabled mobile phone, a tablet computer, a portable computer, a PDA, a portable music device.

12. The system of claim 10 wherein the transponder is a radio frequency identification tag, an RFID tag, a Bluetooth-enabled tag, a Bluetooth-enabled tracker, a Bluetooth-enabled transponder, a Bluetooth-enabled stamp, a device that can interact with a signal broadcast by a digital reader or a device that can interact with a signal broadcast by an IoT beacon.

13. The system of claim 10 wherein the passive transponder is battery powered.

14. The system of claim 10 wherein the beacon signal is directed within the application to emit a signal to locate a specific transponder within a predetermined proximity of the beacon.

15. The system of claim 10 wherein the alert is produced by flashing on a device screen or by an audible alert emission or by vibration of the processor-enabled device or by a combination thereof.

16. The system of claim 10 wherein the beacon is in wireless communication with a plurality of transponders.

17. The system of claim 10 wherein the application allows a user to designate the detection range between the beacon and the transponder or to disable the wireless communication between the beacon and the transponder.

* * * * *